US007615876B2

(12) United States Patent
Marshall

(10) Patent No.: US 7,615,876 B2

(45) Date of Patent: Nov. 10, 2009

(54) MOBILE POWER GENERATION SYSTEM AND METHOD

(76) Inventor: Michael J. Marshall, 3660 W. Quail Ave, Las Vegas, NV (US) 89118

(*) Notice: Subject to any disclaimer, the term of this patent is extended or adjusted under 35 U.S.C. 154(b) by 192 days.

(21) Appl. No.: 11/678,218

(22) Filed: Feb. 23, 2007

(65) Prior Publication Data

US 2008/0202448 A1 Aug. 28, 2008

(51) Int. Cl.
*H02P 9/04* (2006.01)

(52) U.S. Cl. ...................................... 290/1 A; 290/1 C

(58) Field of Classification Search ................. 290/1 R, 290/1 A, 1 B, 1 C, 40 R, 40 C, 52, 40 B; 322/1, 14

See application file for complete search history.

(56) References Cited

U.S. PATENT DOCUMENTS

| | | | | |
|---|---|---|---|---|
| 4,469,954 | A * | 9/1984 | Maehara | 290/1 A |
| 4,992,669 | A * | 2/1991 | Parmley | 290/1 R |
| 5,536,976 | A * | 7/1996 | Churchill | 307/11 |
| 5,689,174 | A * | 11/1997 | Pacheco, Sr. | 322/16 |
| 6,118,186 | A * | 9/2000 | Scott et al. | 290/40 B |
| 6,315,523 | B1 * | 11/2001 | Mills | 417/45 |
| 6,365,983 | B1 * | 4/2002 | Masberg et al. | 290/40 C |
| 7,081,682 | B2 * | 7/2006 | Campion | 290/1 A |
| 7,245,030 | B2 * | 7/2007 | Nelson et al. | 290/1 A |
| 2008/0196758 | A1 * | 8/2008 | McGuire | 136/245 |

* cited by examiner

*Primary Examiner*—Nicholas Ponomarenko
(74) *Attorney, Agent, or Firm*—Jeffrey D. Moy; Weiss & Moy, P.C.

(57) ABSTRACT

A mobile power generating system and method, located on a mobile carrier. A power supply is coupled to an electrical drive motor, to power the drive motor. Rotational output from the drive motor is routed through a gear reduction system to increase one of horsepower and torque, and increased rotational output is then supplied to a generator, generating an electrical output. That output may be routed through a fuse box and transformer to the bus line.

15 Claims, 4 Drawing Sheets

MOBILE POWER GENERATION SYSTEM AND METHOD

FIELD OF THE INVENTION

This invention relates generally to power generating systems and, more particularly, to an improved mobile power generating system and method.

BACKGROUND OF THE INVENTION

Mobile generators may utilize liquid fuel, such as diesel fuel, to provide an electrical output. Mobile power generators have a number of uses. For example, they may be utilized to power equipment in an area that has not been coupled to the regular power grid. They may also be utilized in disaster situations, or the like, where the power supply has been interrupted.

A need always exists to improve the efficiency of mobile generators. The present invention satisfies this need and provides other, related, advantages.

SUMMARY OF THE INVENTION

In accordance with an embodiment of the present invention, a mobile power generating system is disclosed. The system comprises, in combination: A mobile power generating system comprising, in combination: a power supply producing an output of electricity; an electric driver motor connected to the power supply; a gear reduction system connected to the electric drive motor; and a generator connected to the gear reduction system.

In accordance with another embodiment of the present invention, a mobile power generating system is disclosed. The system comprises, in combination: a liquid fuel drive power supply accepting an input of liquid fuel and producing an output of electricity; an electric driver motor connected to the liquid fuel drive power supply; a gear reduction system connected to the electric drive motor; and a generator connected to the gear reduction system.

In accordance with still another embodiment of the present invention, a mobile power generating system is disclosed. The system comprises, in combination: a liquid fuel drive power supply accepting an input of liquid fuel and producing an output of electricity; a starter connected to the output of the power supply; an electric driver motor connected to the starter; a gear reduction system connected to the starter; and a generator connected to the gear reduction system.

In accordance with a further embodiment of the present invention, a method for generating power is disclosed. The method comprises: providing a liquid fuel drive power supply accepting an input of liquid fuel and producing an output of electricity; providing an electric driver motor connected to the liquid fuel drive power supply; providing a gear reduction system connected to the electric drive motor; providing a generator connected to the gear reduction system; wherein the liquid fuel drive power supply, electric drive motor, gear reduction system and generator are located on a mobile carrier; providing liquid fuel to the liquid fuel drive power supply; generating electrical output from the liquid fuel drive power supply; supply the electrical output to the electric drive motor to power the electric drive motor; providing an electrical output from the electrical drive motor; outputting rotational force from the electrical drive motor; routing the rotational force from the electrical drive motor through a gear reduction system; wherein the gear reduction system increases one of torque and horsepower of the rotational force from the electrical drive motor; outputting increased rotational force from the gear reduction system to the generator; and producing electrical output from the generator.

DETAILED DESCRIPTION OF THE PREFERRED EMBODIMENTS

Figure 1:
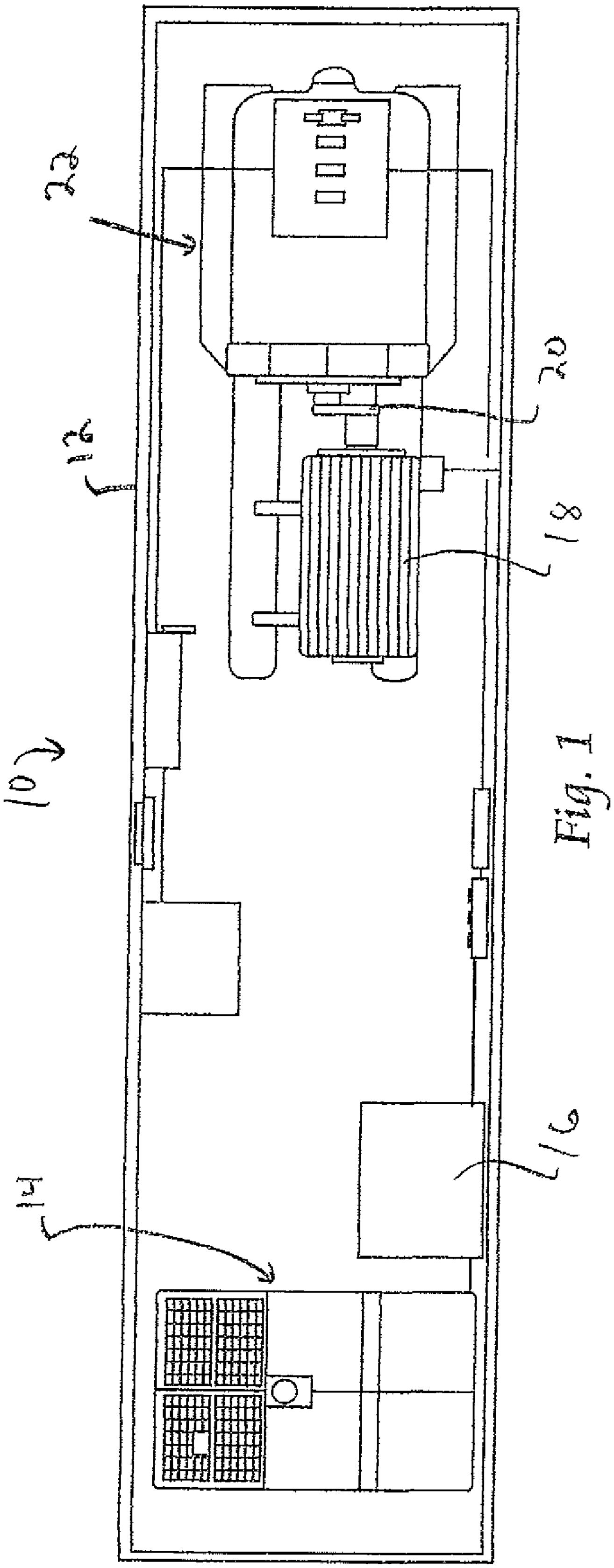
FIG. 1 is a top view of a mobile power generating system consistent with an embodiment of the present invention.
Figure 4:
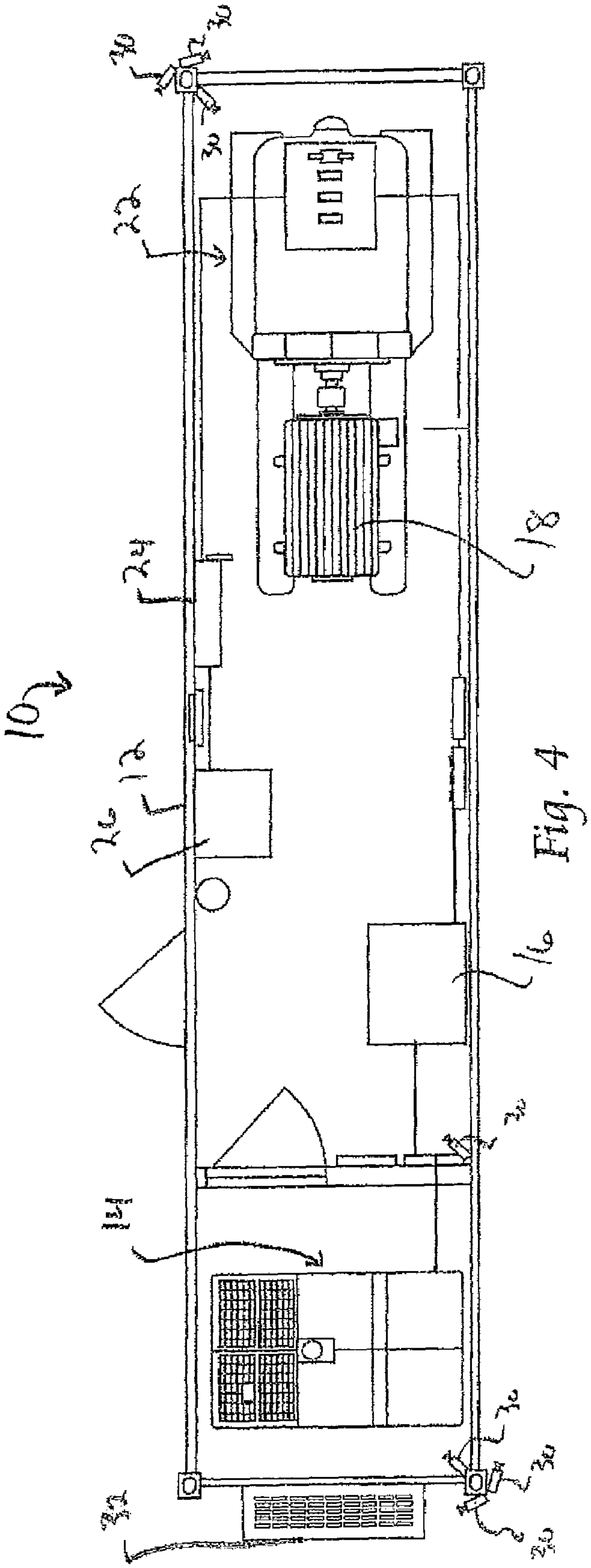
FIG. 4 is a top view of a mobile power generating system consistent with an embodiment of the present invention.

Referring first to FIGS. 1 and 4, a mobile power generating system 10 (hereinafter "system 10") consistent with an embodiment of the present invention is disclosed. Initially, it should be noted that the system 10 may be positioned within a container 12 or the like, and coupled to a tractor trailer (not shown) in order to achieve mobility. The below-described system components are preferably all provided within the container 12, or the like.

A first component of the system 10 is a low fuel consumption generator power supply 14 (hereinafter "power supply 14"). In one embodiment, the power supply 14 is powered by liquid fuel, and preferably by diesel fuel, and outputs an electrical current. In one embodiment, the power supply 14 may consume in the range of 12 to 13 gallons of diesel fuel per hour, and generate an output of 480 volts of current at 500 amps. In another embodiment, the power supply 14 is solar powered. Alternatively, the power supply 14 may also generate power using magnetic means.

In one embodiment, an output of the power supply 14 is coupled to a power starter switch 16, which may be a circuit breaker. The power starter switch 16, in turn, may be connected to an elective drive motor 18. In one embodiment, the electric drive motor, which is powered by electricity generated by the power supply 14, may operate at 480 volts and consume approximately 380 amps at maximum torque and RPM operation. A suitable drive motor 18 would be, for example, a 350 horsepower General Electric motor rated at 1,012 foot pounds of torque. The power starter switch 16 is interposed between the power supply 14 and the drive motor 18 in order to protect the drive motor 18 from electrical overloads.

Referring now to FIGS. 1-4, in one embodiment, the electric drive motor 18 produces a rotational output, and is coupled to a gear reduction system 20. The gear reduction system 20, which may a torque converter, serves to increase the horsepower and/or torque of the electric drive motor 18 through a reduction in gear size. The gear reduction system 20, in turn, is coupled to a generator 22. The purpose of such coupling is to permit the rotational output of the electric drive motor 18, following an increase in torque and/or horsepower by the gear reduction system 20, to rotate a rotor on the generator 22, thereby causing magnetic induction and electricity generation.

Figure 2:
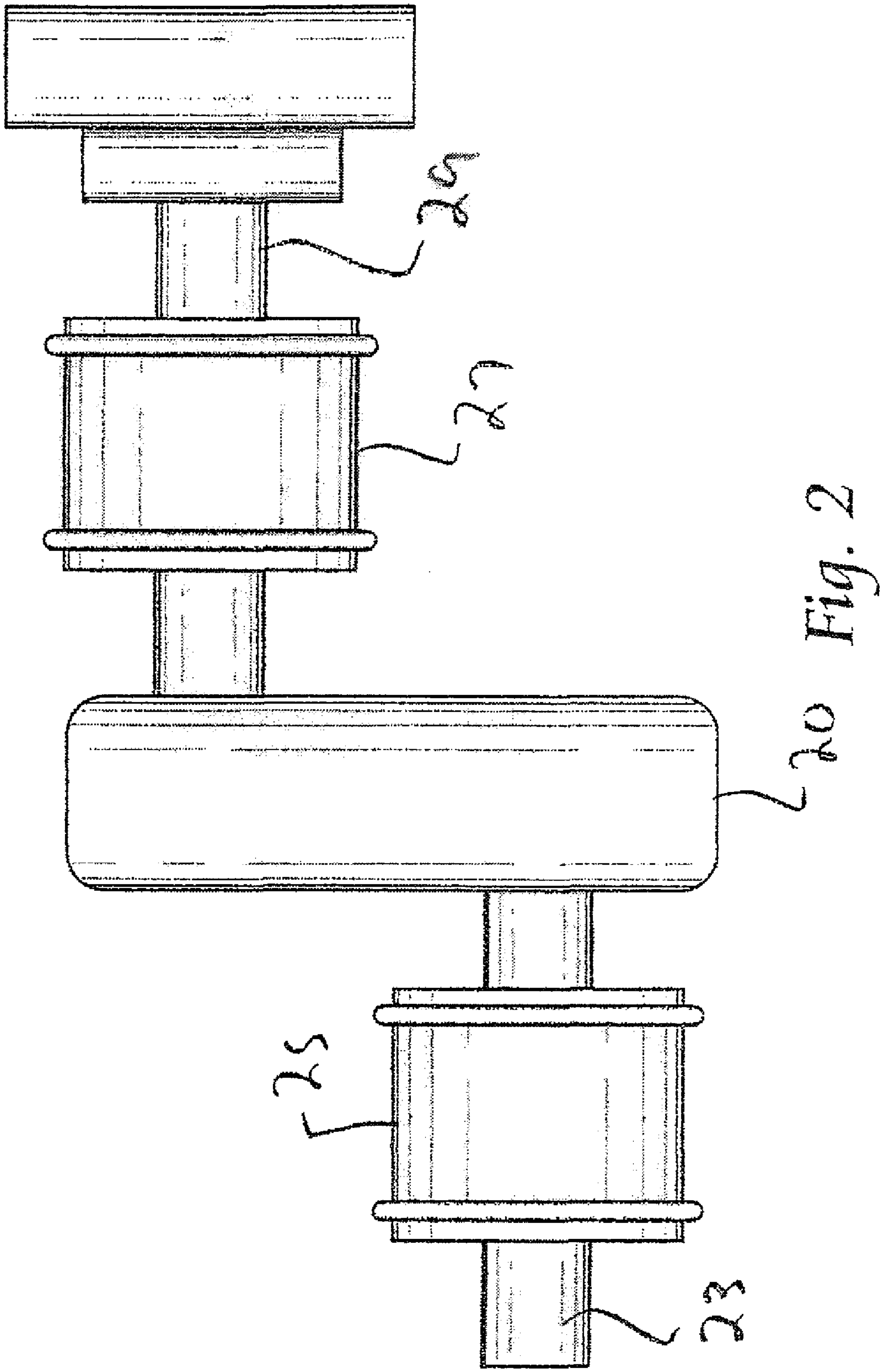
FIG. 2 is a side view of a connection between a drive motor, gear reduction system, and generator in a mobile power generating system consistent with an embodiment of the present invention.
Figure 3:
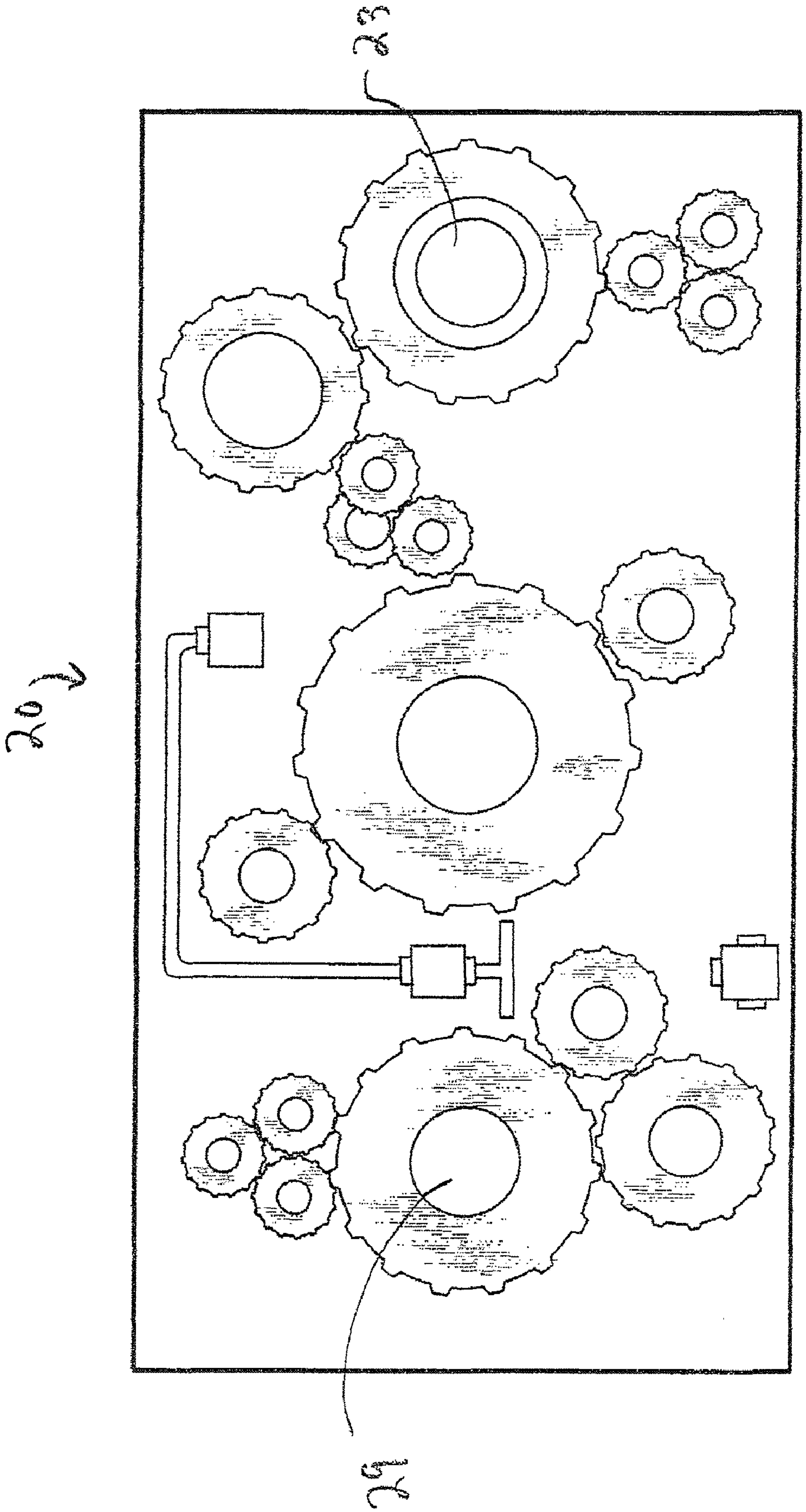
FIG. 3 is a top view of a gear reduction system in a mobile power generating system consistent with an embodiment of the present invention.

Referring now to FIG. 2, and addressing more specifically the interconnection between and among the electric drive motor 18, gear reduction system 20 and generator 22, a rotating shaft 23 from the electric drive motor 18 (not shown) is coupled via coupler 25 to the gear reduction system 20. The gear reduction system 20, in turn, is coupled via coupler 27 to rotating shaft 29, which in turn is coupled to the generator 22 (not shown). (An example of a gear reduction system 20, which may be of any type known in the art, is illustrated in FIG. 3, indicating input from the rotating shaft 23 and output to the rotating shaft 29.)

As configured herein, the generator 22 may produce approximately 2.1 megawatts of electricity on 480 volts of electricity, when receiving rotational input at 1800 RPM at 3,400 horsepower and 3,600 foot pounds of torque. In one embodiment, electrical output from the generator 22 may be routed through a fuse box 24, and then into a transformer 26 to the bus line (not shown). In one embodiment, a front bearing (not shown) is utilized, in combination with the generator 22, to maintain the generator 22 in a relatively level position, so as to increase efficiency. The bearing may be held in position by a main plate (also not shown).

As shown in more detail in FIG. 4, it may be desired to provide a plurality of security cameras 30 on the container 12, so as to secure both an interior and an exterior of the system 10. Still further, it may be desired to provide an air conditioning unit 32, to cool the interior of the container 12.

While the invention has been particularly shown and described with reference to preferred embodiments thereof, it will be understood by those skilled in the art that the foregoing and other changes in form and details may be made therein without departing from the spirit and scope of the invention.

I claim:

1. A mobile power generating system comprising, in combination:

a fossil fuel engine;

a first generator driven by said fossil fuel engine for producing electrical energy;

an electrical driver motor coupled to and powered by the first generator, the electrical drive motor producing a rotational output on a shaft of the electrical drive motor;

a gear reduction system connected to the shaft of the electric drive motor for increasing a torque of the electrical drive motor; and a second generator coupled to the gear reduction system, wherein the gear reduction system rotates a rotor of the second generator to generate electrical power.

2. The system of claim 1 further comprising a power starter switch connected to the first generator and to the electrical driver motor to protect the electrical driver motor from electrical overload.

3. The system of claim 2 further comprising a transformer coupled to the second generator.

4. The system of claim 3 further comprising a fuse box connected to the transformer and the second generator.

5. The system of claim 1 wherein the first generator consumes approximately 12-13 gallons of fuel per hour to generate the electrical energy.

6. A mobile power generating system comprising, in combination:

a fossil fuel engine consuming approximately 12-13 gallons of fuel per hour;

a first generator driven by said fossil fuel engine for producing electrical energy;

an electric drive motor coupled to and powered by the first generator, the electrical drive motor producing a rotational output on a shaft of the electrical drive motor;

a gear reduction system connected to the shaft of the electric drive motor for increasing torque of the electrical drive motor; and a second generator connected to the gear reduction system, wherein the gear reduction system rotates a rotor of the second generator to generate electrical power.

7. The system of claim 6 further comprising a fuse box connected to the second generator.

8. The system of claim 7 further comprising a transformer connected to the fuse box.

9. The system of claim 6 further comprising:

a fuse box connected to an output of the second generator; and a transformer connected to the fuse box.

10. A mobile power generating system comprising, in combination:

a fossil fuel engine consuming approximately 12-13 gallons of fuel per hour;

a first generator driven by said fossil fuel engine for producing electrical energy;

a power starter switch connected to an output of the first generator;

an electric drive motor coupled to and powered by the first generator, the electrical drive motor producing a rotational output on a shaft of the electrical drive motor;

a gear reduction system connected to the shaft of the electric drive motor for increasing torque of the electrical drive motor; and a second generator connected to the gear reduction system, wherein the gear reduction system rotates a rotor of the second generator to generate electrical power.

11. The system of claim 10 further comprising a fuse box connected to the second generator.

12. The system of claim 11 further comprising a transformer connected to the fuse box.

13. The system of claim 10 wherein the second generator produces approximately 2.1 megawatts of electricity when receiving approximately 1800 RPMS at 3,400 horsepower and approximately 3,600 pounds of torque.

14. A mobile power generating system comprising:

a fossil fuel engine consuming approximately 12-13 gallons of fuel per hour and producing 480 volts at 500 amps;

a first generator driven by said fossil fuel engine for producing electrical energy;

a starter connected to an output of the first generator;

an electric drive motor coupled to and powered by the first generator, the electrical drive motor producing a rotational output on a shaft of the electrical drive motor;

a gear reduction system connected to the shaft of the electric drive motor for increasing an output torque of the electrical drive motor;

a second generator connected to the gear reduction system, wherein the gear reduction system rotates a rotor of the second generator to generate electrical power;

a fuse box connected to the second generator; and a transformer connected to the fuse box.

15. The system of claim 14 wherein the second generator produces approximately 2.1 megawatts of electricity when receiving approximately 1800 RPMS at 3,400 horsepower and approximately 3,600 pounds of torque.

* * * * *